Dec. 11, 1928.

K. TJOSSEM 1,694,608

POWER ATTACHMENT FOR CORN PICKERS

Filed Feb. 23, 1928

Inventor
By Kinney Tjossem
Lynn H. Latta — Attorney

Patented Dec. 11, 1928.

1,694,608

UNITED STATES PATENT OFFICE.

KINNEY TJOSSEM, OF PAULLINA, IOWA.

POWER ATTACHMENT FOR CORN PICKERS.

Application filed February 23, 1928. Serial No. 256,264.

My invention relates to a power drive attachment of the type disclosed in my co-pending application, Serial Number 152,829, filed Dec. 6, 1926, allowed September 2, 1927.

The object of the present invention is primarily to overcome an objection to the particular arrangement described in said application, said objection residing in the fact that the power take-off or second elevator shaft of the corn picker, to which the power is applied for driving the picking mechanism, is placed under such a load in the arrangement of my original invention that in some cases breakage will occur.

A further object of the present invention is to provide an improved carriage for the power plant.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1:
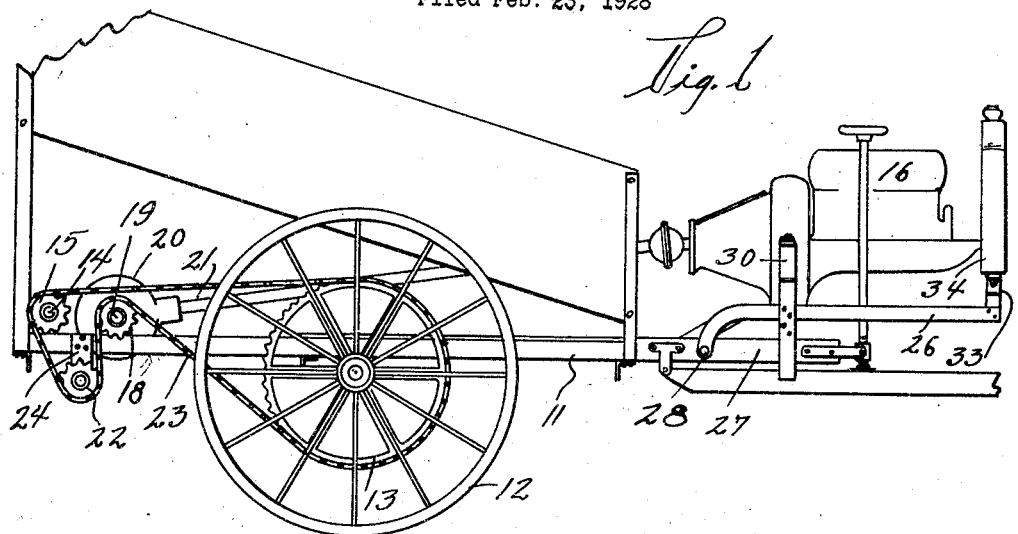
Fig. 1 is a side elevation of portions of a corn picker with my invention attached thereto.
Figure 2:
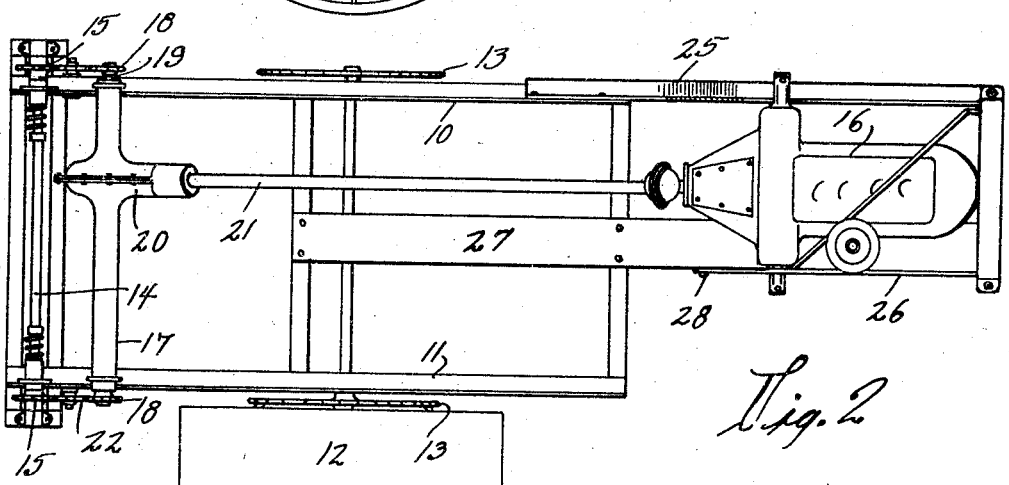
Fig. 2 is a plan view of the same.
Figure 3:
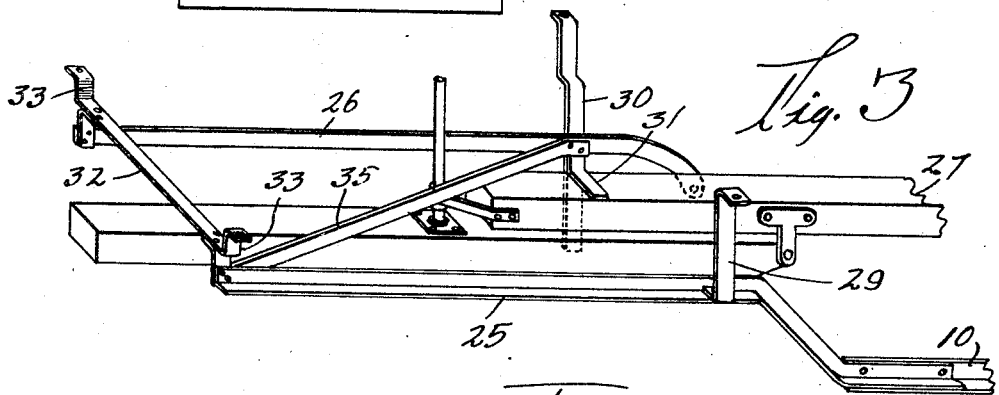
Fig. 3 is a perspective view of the power plant carriage and adjacent portions of the corn picker, to which it is attached, viewed from the opposite side of the machine from Fig. 1.

As stated in my co-pending application, identified above, it has proven practical to adapt an old automobile engine and transmission to the driving of a corn planter. The rear axle of the automobile forms the drive shaft for the picker, the rear axle housing being secured to the frame of the picker adjacent the driven sprockets, to which power for actuating the picking mechanism is normally applied from the bull sprocket of the picker. Sprockets are applied to the vehicle rear axle and a chain is passed over the latter sprockets around the driven sprockets of the picker, around the bull sprockets, and around idler sprockets. Thus the drive sprockets carried by what was once the rear axle of an automobile serve to simultaneously propel the travel wheels of the picker and to motivate the picking mechanism.

The longitudinal rails of the picker are herein referred to generally by the reference characters 10 and 11, the travel wheels by the reference character 12, the bull sprockets by the reference character 13, the power take-off shaft of the picker by the reference character 14 and the driven sprockets by the reference character 15.

As in my former invention, the power plant 16 is carried forwardly of the main body of the picker, the rear axle housing 17 is secured to the frame members 10 and 11, drive sprockets 18 are carried by the axle shaft 19, and the differential 20 and propeller shaft 21 are arranged the same as shown in my co-pending application.

In the original practice of my invention, the idler sprockets 22 were positioned above the drive sprockets 18 and between the latter and the bull sprockets 13. The chains 23 then passed from the upper extremities of the bull sprockets 13, over the idler sprockets 22, thence downwardly and underneath the drive sprockets 18, thence upwardly and around the driven sprockets 15, thence directly back to the bull sprockets 13.

It will be noted that with such an arrangement, the pull applied to the chains 23 from the drive sprockets was applied to the bull sprockets 13 through the medium of the driven sprockets 15. Thus the entire load of the resistance of the machine was carried by the shaft 14, the resistance of the travel wheels being added to the resistance of the picking mechanism.

As a result, I have discovered that a substantial proportion of the machines built according to my original invention have eventually broken down, due to the fact that the pickers were originally built with shafts 14 only heavy enough to carry the load of the picking mechanism. Adding the load of the resistance to forward travel to the picker load has proven too much for the shafts already in the machine.

To substitute heavier shafts would require a complete rebuilding of the driven shaft assembly, including bearings, clutches, etc., and would be too expensive for the purpose of my invention.

I have discovered that the defect may be remedied by simply shifting the position of the idler sprockets to the arrangement shown in Fig. 1. Instead of positioning the sprockets ahead of the drive sprockets and above them the idlers 22 are positioned below the drive sprockets and rearwardly thereof between the latter and the driven sprockets 15. Brackets 24 may be used to support the idlers from the frame members 11 and 10. The chains 23 will then pass from the upper extremities of the bull sprockets 13 directly to the driven sprockets 15, thence around the idlers 22 and thence around and above the drive sprockets 18 and back to the bull sprockets 13.

It will be remembered that the pulling portions of the chains are those portions extending to the lower extremities of the bull sprockets. The upper portions are the slack portions. Consequently the power necessary to drive the travel wheels of the picker will be transmitted directly to the bull sprockets instead of through the medium of the driven sprockets 15. The only load received by the driven sprockets then will be the load of the picking mechanism which it is already designed to receive.

It will be noted that in order to effect the change thus described, it is not necessary to change the relation of the sprockets 18 and 15 relative to each other from that shown in my co-pending application.

The power plant carriage of the present invention is considerably improved over that shown in my prior application being arranged to give the engine a much more resilient support without detracting from the strength of the carriage in resisting the torque of the engine.

The carriage comprises a fixed longitudinal rail 25 secured at one end to the frame member 10 of the picker and a hinged rail 26, secured to the tongue 27 by a single connection 28. A bracket 29 extends upwardly from the rail 25 and the bracket 30 extends upwardly from the rail 26. The bracket 30 is provided with a foot 31, which normally rests on top of the tongue 27 but which may lift therefrom if necessary. The forward ends of the rails 25 and 26 are connected by a cross member 32, the ends of which are bent upwardly to form brackets 33, between which is hung the forward end of the power plant 16, the side brackets of the power plant rest upon the upper ends of the brackets 29 and are secured thereto.

A diagonal brace 35 is employed to rigidify the carriage structure and extends diagonally between the rails 25 and 26.

One side of the carriage, namely, that side including the rail 26, may move upwardly relative to the frame of the picker, but in so doing, the carriage will be moving against the torque of the engine. The latter will thus serve to maintain the foot 31 in engagement with the tongue 27.

Some changes may be made in the construction and arrangement of the parts of my invention without departing from the real spirit and purpose of my invention, and it is my intention to cover by my claim, any modified forms of structure or use of mechanical equivalents, which may be reasonably included within their scope.

I claim as my invention:

In combination with a corn picking vehicle having travel wheels, a bull sprocket, a frame including spaced longitudinal rails, a power receiving shaft journalled upon said frame, just above the rails, parallel to the main wheel axis, and spaced from the wheels, and a driven sprocket on said shaft, a power drive attachment comprising an automobile power plant and transmission mounted upon the frame, the rear axle housing thereof being secured transversely upon the rails, a power drive sprocket secured to the rear axle of said transmission and aligned with the driven and bull sprockets, an idler sprocket mounted on the frame below and between the power drive and driven sprockets, and a chain travelling around and under the bull sprocket, thence over the drive sprocket, thence under the idler sprocket, thence around and over the driven sprocket, and thence back to the bull sprocket.

Signed this 6th day of February, 1928, in the county of O'Brien and State of Iowa.

KINNEY TJOSSEM.